United States Patent
McKown

[11] 3,756,101
[45] Sept. 4, 1973

[54] WORK SUPPORT APPARATUS WITH PIPE GROOVING TOOL

[76] Inventor: Roy P. McKown, 9229 Robin Ln., Indianapolis, Ind. 46240

[22] Filed: Aug. 23, 1971

[21] Appl. No.: 174,021

[52] U.S. Cl. ................ 82/34 R, 82/86 R, 82/101 R
[51] Int. Cl. ............................ B23b 3/36, B23b 3/04
[58] Field of Search .................... 82/96, 46 A, 48, 82/56, 60, 70.1, 70.2, 71, 72, 73, 74, 75, 76, 77, 84, 101, 56, 83, 34

[56] References Cited
UNITED STATES PATENTS

| | | | |
|---|---|---|---|
| 3,166,964 | 1/1965 | Judelson | 82/101 R X |
| 2,241,478 | 5/1941 | Remington | 82/46 A |
| 1,745,699 | 2/1930 | Kleeb et al. | 82/101 R |
| 1,190,192 | 7/1916 | Reichel | 82/84 R X |

*Primary Examiner*—Harrison L. Hinson
*Attorney*—Woodard, Weikart, Emhardt & Naughton

[57] ABSTRACT

A work support apparatus for supporting and rotating a pipe while simultaneously allowing grooving operations to be performed on the pipe. The grooving tool has a pair of removable spaced apart grooving wheels with a removable saw disposed therebetween. The work support apparatus has an idler stand, a support assembly and a power stand for supporting and rotating the pipe. The idler stand has two ball bearings rotatably mounted on the ends of two arms for supporting the pipe. One arm is adjustable towards the other arm to facilitate different sized pipe. Two rollers are rotatably mounted atop the support assembly and are movable to support the pipe. A follower wheel and a driver wheel are rotatably mounted atop the power stand to support and drive the pipe. Various other cutting and grinding tools are mountable on the apparatus.

4 Claims, 7 Drawing Figures

INVENTOR.
Roy Philip McKown
BY
Woodard, Weikart, Emhardt
& Naughton
ATTORNEYS

Patented Sept. 4, 1973
3,756,101
3 Sheets-Sheet 3
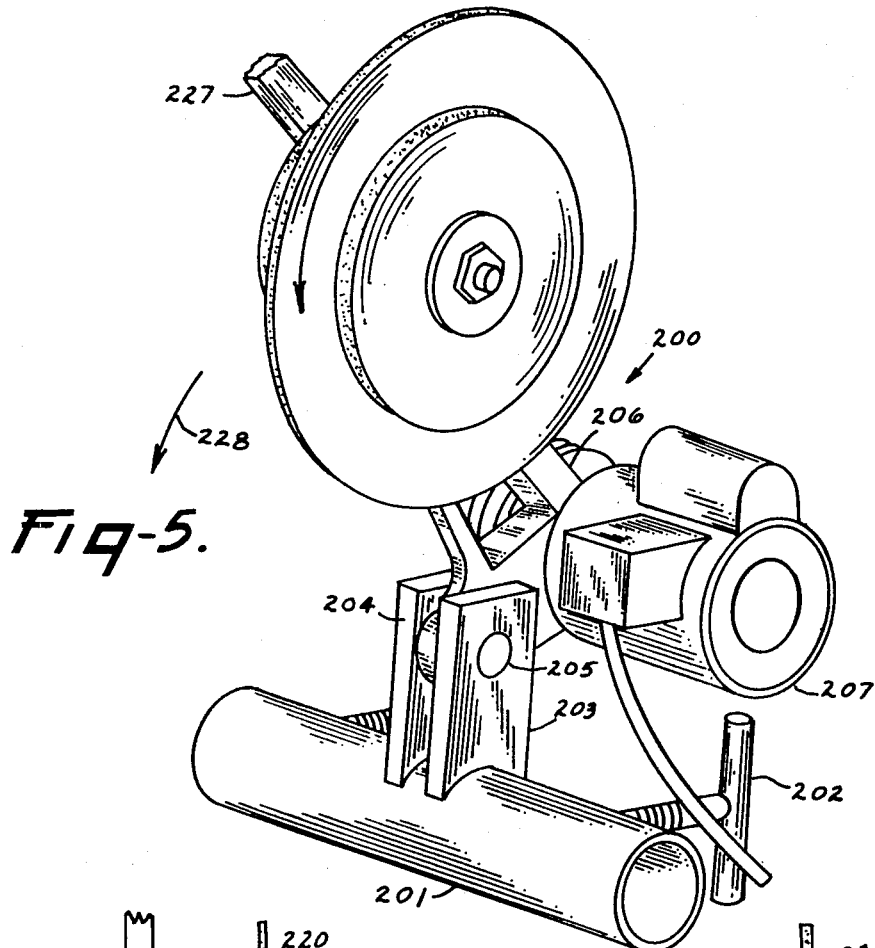
Fig-5.
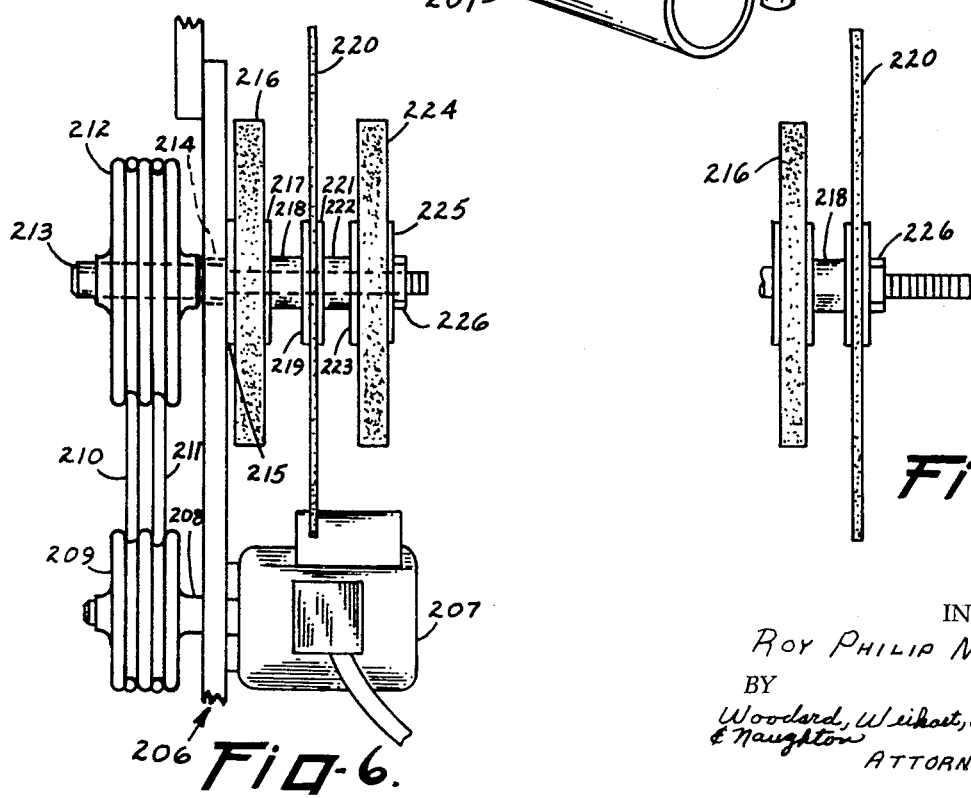
Fig-6.
Fig-7.
INVENTOR.
ROY PHILIP McKOWN
BY
Woodard, Weikart, Emhardt
& Naughton
ATTORNEYS

WORK SUPPORT APPARATUS WITH PIPE GROOVING TOOL

CROSS REFERENCE TO RELATED APPLICATION

The present invention is a continuation-in-part of my copending application Ser. No. 64,530 filed Aug. 17, 1970, now abandoned.

BACKGROUND OF THE INVENTION

1. Field of the Invention

This invention is a work support apparatus and tool for supporting, rotating and cutting a pipe.

2. Description of the Prior Art

Large pipe used in construction industry must be cut and ground to the desired configuration before installation. It is desirable to perform the cutting and grinding at the shop instead of at the construction site; however, this is not always possible. When cutting one of these large pipes in two, it can be appreciated that the cutting must be accomplished evenly or else adjoining pipes will not fit together quickly and easily. The present practice is to utilize a cutting or grinding tool which walks or travels around the stationary pipe. The device provided to carry the tool around the pipe in many cases is sized to receive a restricted range of pipe sizes. Thus, it is necessary to purchase and stock several of these devices. From the above background, it can be seen that there is a need for an apparatus which is adaptable to a broad range of pipe sizes and which allows the pipe to be cut and ground quickly and easily at the shop and/or at the construction site.

The present apparatus fulfills this need by supporting and rotating the pipe while simultaneously allowing grinding and/or cutting operations to be performed on the pipe. I have discovered two workholding devices for holding a workpiece which is being subjected to grinding. These devices are disclosed in the following U.S. Pats: No. 2,834,163 issued to Fay; and, No. 3,091,900 issued to Whittenberg.

My apparatus as contrasted to those previously provided will rotate a pipe in a steady manner preventing sideways movement of the pipe, thereby allowing a fixed position torch or abrasive wheel to cut the pipe evenly and a grinder to bevel the pipe evenly. My apparatus has a combination of elements which may be quickly assembled and disassembled and which receive a variety of tools which may be utilized with the apparatus.

Two pipes may be joined together by various types of couplings. Some couplings require that the adjacent ends of each of the two pipes to be joined have grooves extending around the pipes to receive ribs of the coupling device. Present methods for cutting the groove into each pipe require that the grooving be accomplished on a lathe or other vise-chuck arrangement or manually by using a hand-operated ratchet handle and chuck arrangement. All of these methods are undesirable since the chucks are limited as to the size of pipe which may be accommodated. For example, most chucks will not accept pipe having an outside diameter greater than 8 inches. Disclosed herein is a tool which may be utilized with the pipe support apparatus to groove pipes having a large range of sizes.

SUMMARY OF THE INVENTION

This invention is a supporting apparatus for rotating a pipe which is being welded, cut or ground. The apparatus has an idler stand an power stand aligned with a support assembly. Leveling jacks are provided at the bottom of the legs for leveling the stands. Two ball bearings are rotatably mounted to the top of the idler stand for supporting the pipe and are adjustable to receive different sized pipe. Two rollers are rotatably mounted to the top of the support assembly perpendicular to the longitudinal axis of the pipe being rotated. Two rubber wheels are rotatably mounted by flanges fastened to the power stand. One wheel is driven by an electric motor whereas the other wheel freely rotates. A travel stop mounted to the apparatus has a roller rotatably engaging the end of the pipe. Cutting tools and grinding tools are mountable in different positions on the apparatus. A pipe grooving tool with a pair of removable grooving wheels and a saw is mountable to the apparatus for cutting grooves into the pipe.

It is one object of the present invention to provide an apparatus for supporting and rotating a pipe while simultaneously allowing grinding and cutting operations to be performed on the pipe.

Yet another object of the invention is to provide an apparatus for rotating a pipe in a steady manner preventing sideways movement of the pipe and thereby allowing a fixed position torch or abrasive wheel to cut the pipe evenly and a grinder to bevel the pipe evenly.

It is an additional object of the present invention to provide the above described apparatus having a combination of lightweight and inexpensive components which may be quickly assembled and disassembled.

In addition, it is an object of the present invention to provide the above described apparatus which is also adaptable to different sizes of pipes and different types of tools for operating on the pipe.

An object of the present invention is to provide a work support apparatus with a pipe grooving tool.

Also an object of the present invention is to provide an improved pipe grooving tool.

BRIEF DESCRIPTION OF THE DRAWING

FIG. 5 is a perspective view of a pipe grooving tool.

FIG. 6 is a fragmentary view of the tool of FIG. 5 showing the grooving wheels, saw and driving arrangement.

FIG. 7 is a fragmentary view of the top portion of FIG. 6 showing one of the grooving wheels removed from the spindle.

DESCRIPTION OF THE PREFERRED EMBODIMENT

Figure 1:
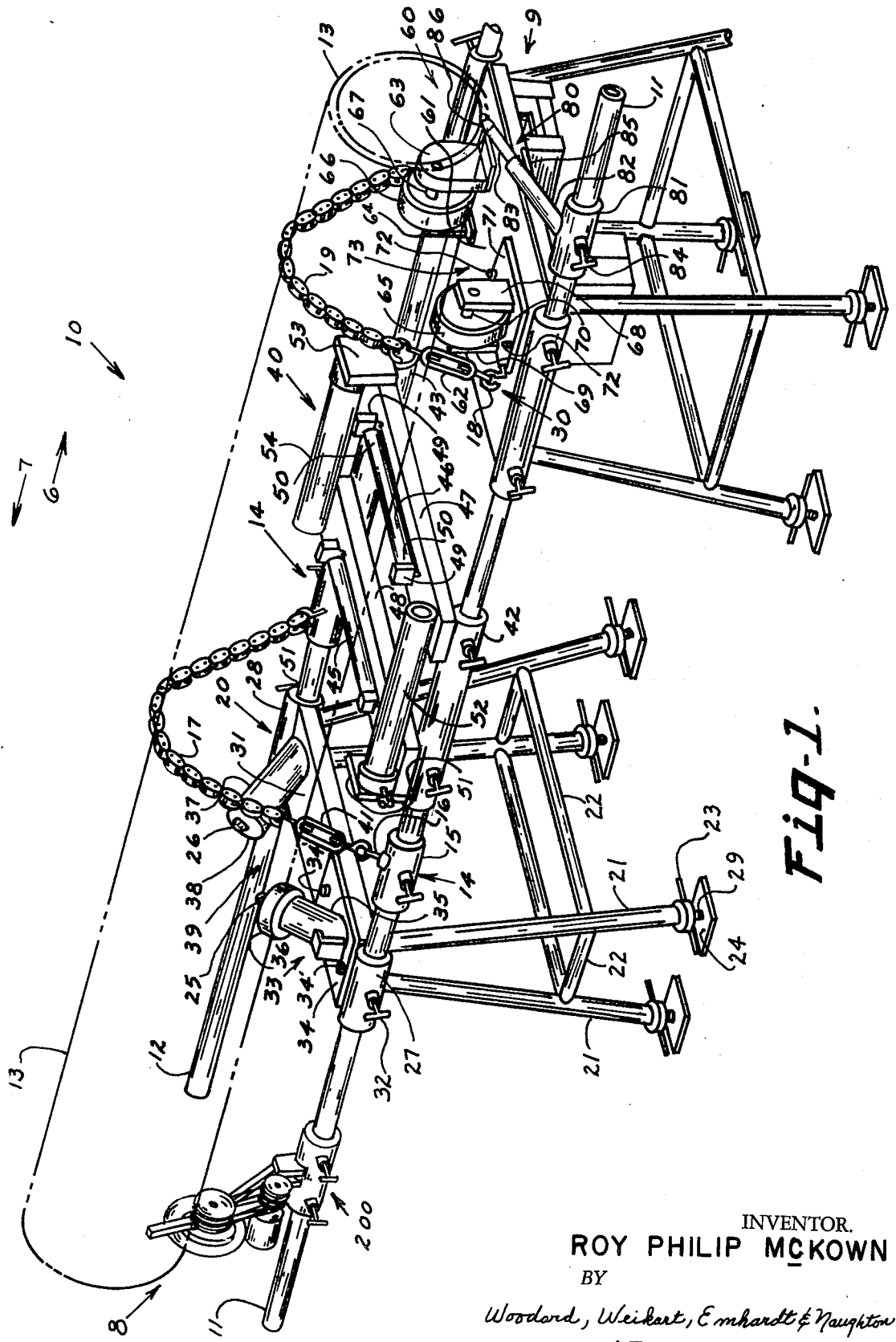
FIG. 1 is a perspective view of a work support apparatus incorporating the present invention.

For the purpose of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1, there is illustrated a work support apparatus 10 for holding and rotating a large pipe 13. Work support apparatus 10 has an idler stand 20, a support assembly 40, and a power stand 60 for holding pipe 13. In addition, apparatus 10 has a travel stop 80 and retainers 14 and 30 for securing pipe 13 to stands 20 and 60. As will be described later in this specification, pipe 13 is supported and rotated by apparatus 10 while various welding, cutting and grinding operations are performed. Pipes or rods 11 and 12 extend through sleeves integrally attached to stands 20 and 60 and support assembly 40, thereby securing the stands and assembly in one continuous line. The apparatus is operable by joining the stands with one or two rods.

Idler stand 20 has four legs 21 attached to base 31. Legs 21 may be attached to base 31 by welding or other suitable means. Base 31 may be a single plate or may be made in an inverted box-like configuration. Cross bars 22 are welded to legs 21 thereby providing for structural rigidity of stand 20. Each leg 21 has a swivel leveling jack 23 at their bottom to permit leveling of the idler stand in the event that the floor or ground is not level. Leveling jacks 23 are standard construction and threadedly receive the threaded rod 29 mounted to plate 24. Welded to the sides of base 31 are hollow sleeves 27 and 28 for receiving respectively rods 11 and 12. These rods may be standard or extra heavy pipe. Two handled fastening devices 32 are threaded into each sleeve 27 and 28 with blunt ends for abutting against rods 11 and 12. Thus, with rods 11 and 12 inserted through sleeve 27 and 28, handled fastening devices 32 may be turned and forced against the rods thereby preventing motion of idler stand 20 with respect to rods 11 and 12.

Mounted atop idler stand 20 on base 31 are arms 35 and 37 having ball bearings 25 and 26. Arm 37 is fixedly fastened to base 31 by welding and has race 38 threadedly received on its top rotatably retaining the protruding ball bearing 26. On the other hand, arm 35 is welded to a plate 34 movable to and from arm 37. The shanks of bolts 34' pass through plate 34 and also through slots in base 31. The head of bolts 34' rest atop plate 34, whereas the shanks receive nuts, not shown. Thus, bolts 34' may be untightened and arm 35 may be adjusted to and from arm 37. When the desired spacing 39 between ball bearings 25 and 26 has been achieved, bolts 34' are then tightened, thereby securing adjustable bearing assembly 33 to idler stand 20. Arm 35 also has a race 36 mounted at its top for rotatably retaining ball bearing 25. Space 39 is varied until ball bearing 25 and 26 contact and support pipe 13.

Mounted adjacent idler stand 20 on rods 11 and 12 are two retainers 14 each having a sleeve 15 for receiving the rod. Handled fastening devices, identical to device 32 previously described, secure the two sleeves to rods 11 and 12. Mounted atop sleeves 15 are hooks 16, one of which is connected to turnbuckle 41, which is fastened to roller chain 17 extending over the top of pipe 13 preventing the pipe from rolling off of apparatus 10. Chain 17 should not be tightened sufficiently to prevent pipe 13 from rotating. In many cases, pipe 13 has an elbow fastened to its end providing for eccentric loading conditions. As pipe 13 is rotated, it can be appreciated that the pipe will tend to rotate faster when the elbow is in the most upward position rotating towards the most downward position. Chain 17 permits steady rotation of the eccentric loaded pipe by applying pressure to the body of the pipe. The opposite end of chain 17 is fastened to the other hook 16.

Mounted to rods 11 and 12 between retainers 14 and power stand 60 is support assembly 40. Two rollers 45 and 46 are rotatably mounted to the top of support assembly 40. As pipe 13 is moved along apparatus 10 while it is being placed on or taken from apparatus 10, rollers 45 and 46 will rotate, thereby assisting the lateral movement of pipe 13. Support assembly 40 has two sleeves 42 and 43 receiving rods 11 and 12. Handled fastening devices identical to those previously discussed are threaded into the sleeves for preventing motion between support assembly 40 and rods 11 and 12. Welded atop sleeves 42 and 43 are bars 47 and 48 in spaced relation. Upstanding members 49 are adjustably mounted to the top of bar 47 with the journalled ends of rollers 46 rotatably mounted to members 49. Members 49 are mounted to bar 47 by a bolt and nut arrangement allowing roller 46 to be raised or lowered with respect to bar 47. Roller 45 is mounted in an identical manner. Cantilevered to vertical member 51 is rod 52. Member 51 is welded atop bar 48 and is integrally joined to rod 52. The free end of rod 52 is in spaced relation over bar 47 for receiving the tools to be discussed later in the specification. An identical rod 54 is integrally joined to vertical member 53 which is welded atop bar 47 over sleeve 43. Likewise, the free end of rod 54 is in spaced relation to bar 48.

Power stand 60 is configured and constructed similar to idler stand 20. That is, stand 60 has four legs attached to base 61 with swivel leveling jacks receiving threaded rods mounted to the top of plates. Likewise, cross bars are attached to the legs providing for structural rigidity. The stand has two sleeves for receiving rods 11 and 12 with handled fastening devices threaded through the sleeves to prevent motion between stand 60 and rods 11 and 12. Two hooks 18, only one is shown, are mounted atop of base 61. These hooks are identical to hooks 16, one of which has a turnbuckle 62 fastened to it identical to turnbuckle 41. A roller chain 19 is attached to turnbuckle 62 and hook 18 extending over pipe 13 in a similar manner previously described for chain 17. Also, mounted atop base 61 are rotatable wheels 65 and 66 for contacting and rotating pipe 13. Wheel 65 is not positively driven and is a follower wheel, whereas wheel 66 is driven by a suitably sized electric motor. Wheel 66 is rotatably mounted on axle 67 to upstanding member 64 and gearbox 63. Member 64 and gearbox 63 are mounted to the top of base 61. A suitably sized gear mounted to axle 67 within gearbox 63 is engaged by a conventional chain or gear drive mechanism, which in turn is driven by an electric motor (not shown) mounted beneath base 61. Wheel 65 is rotatably mounted to upstanding members 68 and 69 by axle 70. Members 68 and 69 are welded to the top of plate 71, which is movable across the top of base 61. Bolts 72, having shanks extending through plate 71 and through slots (not shown) in base 61, receive complementary sized nuts. Thus, the spacing 73 between wheels 65 and 66 may be adjusted in a manner similar to the adjustment of spacing 39. That is, bolts are untightened and plate 71 is moved toward wheel 66 until the desired spacing 73 is achieved. Then, bolts 72 are tightened thereby preventing motion between plate 71 and base 61.

Mounted adjacent power stand 60 on rod 11 is travel stop 80. Sleeve 81 is slipped onto rod 11 having a handled fastening device 84 for preventing motion between rod 11 and sleeve 81. A second sleeve 82 is welded to sleeve 81 receiving rod 83 having a roller 86 rotatably mounted to its top. A handled fastening device 85 is threaded into sleeve 82 abutting against rod 83. Rod 83 may be telescoped in and out of sleeve 82 until roller 86 abuts pipe 13. Fastening device 85 is then tightened preventing motion of rod 83 with respect to sleeve 82. Roller 86 is rotatably mounted to the end of rod 83 by a bolt which is threadedly received into rod 83. Sleeve 81 is adjusted on rod 11 until rod 83 is perpendicular to the surface of pipe 13. Rod 83 is adjusted with respect to sleeve 82 until roller 86 abuts and is in line with the end edge of pipe 13.

Figure 2:
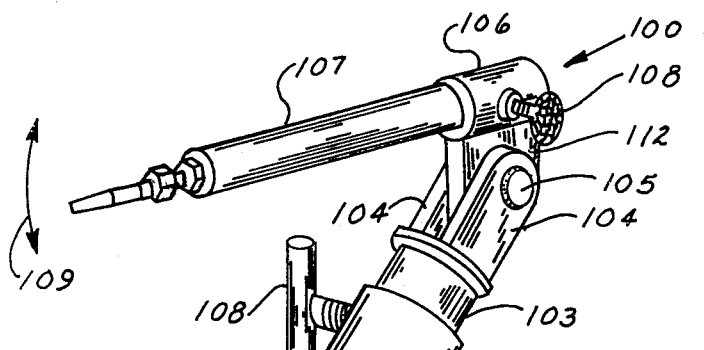
FIG. 2 is a perspective view of a torch device useable with the apparatus of FIG. 1.

FIG. 2 is a perspective view of a gas cutting torch 100 used with the work support apparatus of FIG. 1. Torch 100 has a sleeve 101 with an inside diameter slightly greater than the outside diameter of rods 11, 12, 52 and 54. Thus, sleeve 101 may be slipped onto rods 11, 12, 52 or 54 and tightened thereon with handle fastening devices 111 which are threadedly received into sleeve 101 abutting against the rod. Housing 102 welded to the sleeve 101 receives shaft 103. Two ears 104 are welded to the top of shaft 103 and are spaced apart for rotatably receiving flange 112 of holder 106. Flange 112 is rotatably mounted to the ears by pin 105. The torch body 107 is slipped into holder 106 and is secured therein by handle fastening device 108 which is threadedly received by holder 106 abuttingly engaging torch body 107. As pipe 13 (FIG. 1) is rotated at the required speed and with gas cutting torch 100 in the proper stationary position, pipe 13 may be cut at right angles or at any desired angle. Torch body 107 may be positioned in housing 102 by rotating shaft 103 in a clockwise or counterclockwise direction with respect to housing 102 and then by locking shaft 103 in the desired position by tightening device 108. Likewise, torch 107 may be extended away from sleeve 101 by extending shaft 103 outwardly from housing 102 and then by tightening device 108. Torch body 107 may be pivoted in the direction of arrows 109 about pin 105 until the desired angle of cutting is achieved.

Figure 3:
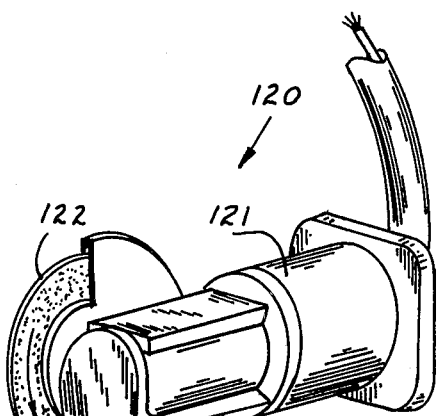
FIG. 3 is a perspective view of a grinding device useable with the apparatus of FIG. 1.

FIG. 3 is a perspective view of an angle grinder 120 which is used to bevel the end of pipe 13 as the pipe is being rotated. Grinder 120 has a grinding wheel 122 rotatably mounted and driven by electric motor 121. Wheel 122 is rotatably mounted to the top of shaft 125 which is received in sleeve 124. Electric motor 121 is fixedly mounted to the top of shaft 125 by fastening devices or other suitable means. Shaft 125 may be rotated and extended from sleeve 124 and is locked into position by fastening device 126 threaded into sleeve 124 abutting against shaft 125. Sleeve 124 is welded to sleeve 123 which has an inside diameter equal to the inside diameter of sleeve 101 of FIG. 2. Thus, angle grinder 120 may be positioned on any one of rods 11, 12, 52 or 54. Sleeve 123 is locked into place on rods 11, 12, 52 and 54 by fastening devices 127.

Figure 4:
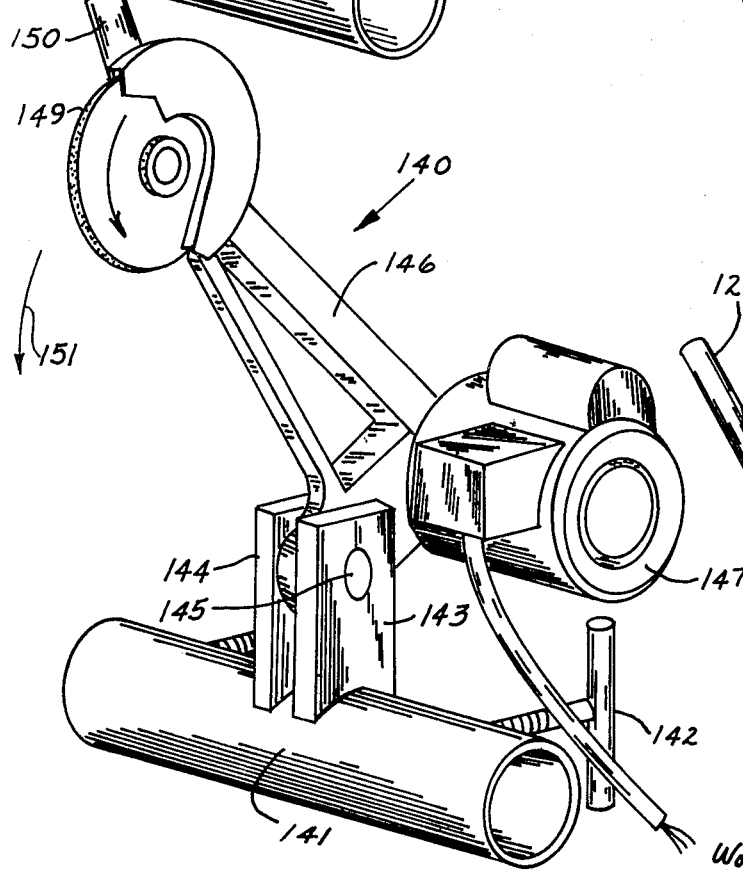
FIG. 4 is a perspective view of a saw device useable with the apparatus of FIG. 1.

FIG. 4 is a perspective view of an abrasive cut-off device 140 useable with the work support apparatus of FIG. 1. Device 140 has a sleeve 141 having an inside diameter identical with the inside diameter of sleeves 123 and 101. Thus, device 140 may be slipped onto rods 11, 12, 52 or 54 and locked in place by fastening devices 142. Flanges 143 and 144 are welded to sleeve 141 pivotally receiving body 146. Pin 145 pivotally mounts body 146 to flanges 143 and 144. An electric motor 147 of suitable size is mounted to body 146 for rotating abrasive wheel 149. Handle 150 is fixedly secured to body 146 and is used to grasp and swing device 140 in a direction towards or opposite of arrow 151 about pin 145. With abrasive cut-off device firmly mounted on one of rods 11, 12, 52 or 54, the device may be swung into position to cut accurately the rotating pipe 13.

To operate apparatus 10, plates 34 and 71 are first adjusted. Adjustable ball assembly 33 should be moved until ball bearings 25 and 26 rest against pipe 13. Likewise, plate 71 of power stand 60 should be adjusted until wheels 65 and 66 abut against pipe 13. Spacing 39 and 73 should be approximately equal or else pipe 13 will not be parallel with rods 11, 12, 52 and 53, thereby preventing even cutting and beveling. Plates 34 and 71 should be secured by tightening bolts 34f and 72. In the event that an elbow or tee is fastened to either end of pipe 13 providing for an eccentric loading condition, then chains 17 and 19 should be placed over pipe 13 and secured to their respective hooks. Turnbuckles 41 and 62 are then tightened to allow pipe 13 to be rotated at a steady rate. Travel stop 80 is mounted to rod 11 or 12 at end 8 or 9 of the apparatus. As pipe 13 is rotated, the pipe has a tendency to move in the direction of arrow 6 or 7. Thus, the pipe should be rotated to determine whether the pipe will move in the direction of arrow 6 or arrow 7. After the direction of travel has been determined, then travel stop 80 may be mounted on the applicable end to prevent this travel. For example, if it is determined that pipe 13 will travel in the direction of arrow 6, then travel stop 80 would be mounted to rod 11 or 12 at end 9. Once sleeve 81 of travel stop 80 has been mounted to rod 11 or 12, device 84 is tightened and rod 83 is extended perpendicular to pipe 13 until roller 86 abuts the end of pipe 13. Device 85 is then tightened. Apparatus 10 is now ready for use with any of the tools illustrated in FIGS. 2, 3 and 4.

Pipe 13 does not touch rollers 45 and 46 while the pipe is rotating and instead, is used to support the pipe when it is placed on and taken from apparatus 10. In addition, rollers 45 and 46 support the pipe after it is cut in two separate pieces by torch 100 or saw 140 positioned on rods 52 or 54.

It will be obvious from the above description that the present invention provides an apparatus for supporting and rotating a pipe while simultaneously allowing grinding or cutting operations to be performed on the pipe. It will be further obvious that the above described apparatus rotates a pipe in a steady manner, preventing sideways movement of the pipe, thereby allowing a fixed position torch or abrasive wheel to cut the pipe evenly or a grinder to bevel the pipe evenly. It will also be obvious that the present apparatus has a combination of lightweight and inexpensive components which may be quickly assembled and disassembled. In addition, it will be obvious that a variety of tools may be utilized with the present invention. It will be further obvious that the present invention provides a new and improved pipe grooving tool.

Conventional electric controls are provided with the present apparatus to vary the pipe rotation. A standard foot pedal has been found to be particularly useful to control the pipe rotation, since the hands of the user are free for tool operation.

Referring now to FIG. 5, there is shown a pipe grooving tool for use with the work support apparatus 10 shown in FIG. 1. As previously discussed, two pipes may be joined together by various types of couplings. One such coupling is produced by the Victaulic Company of America, 3100 Hamilton Blvd., South Plainfield, N. J. This latter coupling has a circular gasket which slips over the abutting ends of the two pipes. A pair of C-shaped clamps are then secured together around the gasket with each clamp having a pair of outer ribs received in complementary sized grooves provided in each pipe. The tool shown in FIG. 5 is used to form these grooves into pipes.

Pipe grooving tool 200 has a sleeve 201 with a pair of threaded fastening devices 202. Sleeve 201 may be slipped onto rod 11 or 12 and devices 202 tightened. An inverted U-shaped sleeve may be utilized in lieu of the circular sleeve 201 to facilitate the installation and removal of the tool from the rod. A pair of upstanding members 203 and 204 are fixedly mounted atop sleeve 201 with the tool body 206 pivotally pinned by pin 205 to brackets 203 and 204. A 3 horsepower electrical motor 207 is mounted to body 206 and has a rotatably driven output shaft 208 (FIG. 6) with a double grooved pulley wheel 209 fixedly secured thereto. A pair of continuous belts 210 and 211 extend around pulley wheel 209 and pulley wheel 212 which is fixedly mounted to spindle 213. The spindle is rotatably mounted by bearings 214 to body 206. The distal end of the spindle is threaded to receive a hexagonally shaped nut 226 for securing a pair of grooving wheels 216 and 224 and a saw 220. Spindle 213 is provided with a shoulder abutting washer 215. Spindle 213 extends through spacer 218 disposed between wheel 216 and saw 220 and spacer 222 disposed between saw 220 and wheel 224. Washers 217 and 219 are positioned on either side of spacer 218 and washers 221 and 223 are positioned on either side of spacer 222. Washer 225 is positioned between wheel 224 and nut 226. Wheels 216 and 224 as weel as saw 220 rotate with the spindle with the washers and nut 226 securing wheels 216, 224 and saw 220 to the spindle.

If it is desired to cut the pipe into two pipes and to cut a groove into only one of the pipes, then wheel 224, spacer 222 and washers 221 and 223 may be removed with nut 226 being threaded further onto spindle 213 as shown in FIG. 7. In the event that it is desirable to cut a single groove into a single pipe, then saw 220 and spacer 218 may be removed so as to leave a single grooving wheel on the spindle. Two grooves may be cut into a single pipe by removing saw 220 from the spindle and installing wheels 216 and 224 on the spindle being spaced apart by a single spacer. The width of a groove may be controlled by selecting a grooving wheel of the appropriate width. Likewise, the distance from the groove to the end of the pipe may be controlled by selecting a spacer of the appropriate width. Wheels 216 and 224 as well as saw 220 may have a circumferential abrasive cutting edge or a diamond impregnated cutting edge or a solid carbide cutting edge.

A handle 227 (FIG. 5) is fastened to the top of body 206 so as to allow the rotating grooving wheels and/or saw to be pivoted downwardly in the direction of arrow 228 to engage the rotating pipe 13 (FIG. 1).

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected. For example, support assembly 40 may be positioned on either side of the idler stand 20 or power stand 60, depending upon the application. Likewise, travel stop 80 may be positioned at the end 8 or at end 9 of rod 11 or 12. Stands 20 and 60 may be spaced apart at any distance depending upon the length of pipe 13. Tool 200 may be mounted in a variety of locations on rods 11 and 12. Idler stand 20 and power stand 60 plus one or two tripod adjustable pipe supports with screw jacks which support members having ball bearings mounted thereon similar to those of idler stand 20 may also be used. In the latter cases, a rod may be used to join the adjustable pipe supports together with tool 200 mounted therebetween. The main body of tool 200 is pivotally mounted about a fixed axis allowing square cutting of rotating large-diametered pipe.

The invention claimed is:

1. A pipe grooving tool comprising:
a main body having an electric motor mounted thereon and a spindle rotatably driven by said motor, said spindle has a pair of spaced apart and removable groove cutting wheels, said body has a mounting portion engageable with a rod;
said spindle has a removable saw mounted thereon and disposed between said wheels, said saw and said wheels are fixed to said spindle so as to rotate with said spindle thereby allowing said saw to sever a pipe while said groove cutting wheels simultaneously cut a pair of grooves into the adjacent ends of the severed pipe.

2. The tool of claim 1 wherein:
said mounting portion is a sleeve mountable on said rod, said spindle is pivotally mounted on said sleeve allowing said wheels and said saw to be moved to and from a pipe rotatably supported.

3. The tool of claim 2 wherein:
said spindle has a threaded distal end receiving said wheels and said saw, said spindle has spacers positioned between said wheels and said saw, said body has a belt-pulley arrangement drivingly connecting said motor to said spindle.

4. The tool of claim 3 wherein:
said main body is pivotally mounted about a fixed axis allowing square cutting of rotating large-diametered pipe.

* * * * *